M. R. FLANDERS.
Grain Cradle.
No. 1,118. Reissued Jan. 8, 1861.
Fig. 1,
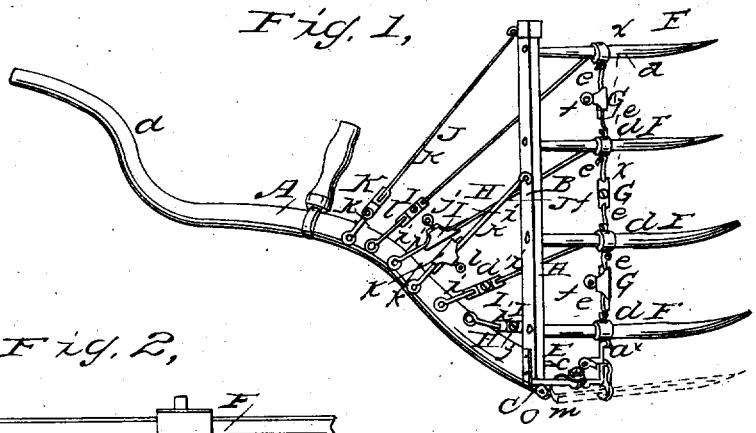
Fig. 2,
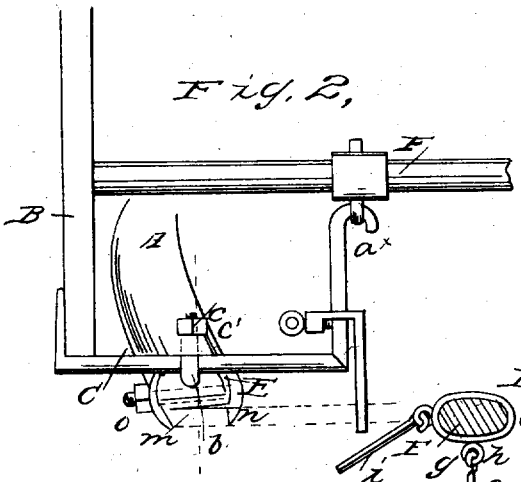
Fig. 3,
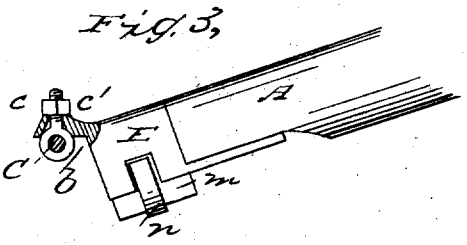
Fig. 4,
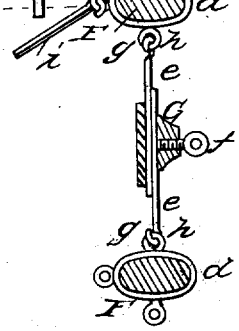
Witnesses:
David Daggett
A. L. Smith
Inventor:
Moses R. Flanders
N. PETERS, Photo-Lithographer, Washington, D. C.

UNITED STATES PATENT OFFICE.

MOSES R. FLANDERS, OF GREENWICH, NEW YORK.

IMPROVEMENT IN GRAIN-CRADLES.

Specification forming part of Letters Patent No. 24,550, dated June 28, 1859; Reissue No. 1,118, dated January 8, 1861.

*To all whom it may concern:*

Be it known that I, MOSES R. FLANDERS, of Greenwich, in the county of Washington and State of New York, have invented a new and Improved Grain-Cradle; and I do hereby declare that the following is a full, clear, and exact description of the same, reference being had to the accompanying drawings, making a part of this specification, in which—

Figure 1 is a perspective view of my invention. Fig. 2 is a section of the same, showing the manner in which the finger-standard is attached to the snath. Fig. 3 is a section of the snath, showing its lower part with its fastenings. Fig. 4 is a section of two of the fingers of the same, taken in the line *x x*, Fig. 1.

This invention consists in a novel mode of attaching the finger-standard to the snath and bracing the fingers, and also connecting the fingers together, as hereinafter fully shown and described, whereby the several parts are rendered capable of being readily adjusted to suit the operator or as occasion may require, and a very strong and durable implement obtained.

To enable those skilled in the art to fully understand and construct my invention, I will proceed to describe it.

A represents the snath of the implement, the lower part of which may be of the usual form; but the upper part is made of a rather more sinuous form than usual, as shown at 1, Fig. 1.

B is a finger-standard, the lower end of which has a metal rod, C, attached at right angles, said rod having its outer end bent upward and hooked to the lower finger, as shown at *a*. (See Figs. 1 and 2.) The rod C passes through an eye, *b*, which is secured by a nut, *c*, in a metal projection, *c'*, attached to a ferrule, E, which is on the lower end of the snath.

To the standard B a series of fingers, F, are attached. These fingers are of the usual form, and are attached to the standard in the ordinary way. On each finger F a metal collar, *d*, is placed and permanently secured. These collars *d* are connected together by rods *e*, which overlap each other between the fingers, each pair of rods being fitted in a socket, G, and secured therein by a set-screw, *f*, as clearly shown in Fig. 4. The sockets G are of metal, and the rods *e* are connected to the collars by hooks and eyes *g h*, the latter being attached to the collars, and the former being formed at the ends of the rods. This is clearly shown in Fig. 4.

H represents finger-braces, each of which is formed of the rods *i i*, which overlap each other and are fitted in a socket, I, and secured therein by a set-screw, *j*. One rod *i* of each brace is attached to the snath, and the other rod is attached to a finger F. (See more particularly Fig. 1.) The finger-standard B is braced by two braces, J, which are also formed each of the rods *k k*, connected by a socket, K, and screw *l*, one rod *k* being attached to the snath and the other to the finger-standard. The ferrule E has a lip or projection, *m*, formed on it, and a jaw, *n*, passes through the ferrule, said jaw having a screw-thread formed on its tang, on which a nut, *o*, is fitted. (See Fig. 2.) To the outer part of the rod C a bearing, *p*, is attached for the scythe, which is shown in red in Figs. 1 and 2.

From the above description of parts it will be seen that the fingers F may be more or less distended by adjusting the rods *e* in their sockets G, and the fingers by said rods may be secured at a proper distance apart. It will also be seen that the fingers F may be virtually increased or decreased in length by adjusting the rod C in the eye *b*, which, in connection with the braces H J, secure the fingers and standard to the snath. By having the braces H J formed each of the rods connected by a socket and set-screws, said braces are enabled to be adjusted and lengthened or shortened to suit the position of the fingers and standard. The fingers also are allowed to be set farther in and from the snath to suit the operator. In fact, the fingers admit of a general adjustment, all that may be desired to suit any operator, and still work equally well at any point of adjustment within the range of their movement. The scythe is secured between the lip *m* and jaw *n*.

As regards the adjustment of the fingers F, I would state that there is one important feature connected with it, and that is the collars *d*. These collars while forming a secure means for connecting the rods *e* to the fingers do not weaken them, as would be the case were staples or hooks employed and driven into the fingers. On the contrary, the collars rather tend to strengthen the fingers, and serve not only as a secure and ready means for attaching the rods *e* to the fingers, but also as a very durable one.

Having thus described my invention, what I claim as new, and desire to secure by Letters Patent, is—

1. Attaching the finger-standard B to the snath A by means of the rod C and eye *b*, secured respectively to the standard and snath, in combination with the compensating or adjustable braces H J, the whole being constructed and arranged substantially as and for the purpose set forth.

2. The compensating or adjustable braces or stays that connect the fingers F, and which are formed of the rods *e e*, and socket G, when said rods are connected to the fingers F by the collars *d*, substantially as set forth.

MOSES R. FLANDERS.

Witnesses:
D. H. BOIES,
O. K. RICE.